United States Patent [19]
Mansfeld

[11] 3,797,188
[45] Mar. 19, 1974

[54] BRACKET STRUCTURE FOR ELASTIC EXPANSION GAP SEALING DEVICES

[75] Inventor: Hans Mansfeld, Heilingenhaus, Germany

[73] Assignee: Firma Migua Mitteldeutsche Gummi-und Asbestgesellschaft Hammerschmidt & Co., Heiligenhaus, Germany

[22] Filed: Mar. 23, 1972

[21] Appl. No.: 237,289

[30] Foreign Application Priority Data
Mar. 27, 1971 Germany............................ 2114956

[52] U.S. Cl. ............... 52/396, 14/16, 404/2, 404/12, 404/47, 404/68, 404/73
[51] Int. Cl. .................... E04f 15/14, E01c 11/10
[58] Field of Search ............... 52/396; 94/18, 18.2; 14/16; 404/2, 12, 47, 73, 87, 66, 67–69, 64, 68

[56] References Cited
UNITED STATES PATENTS
3,371,456  3/1968  Balzer et al............................ 94/18
3,390,501  2/1968  Driggers................................ 52/396
3,447,430  6/1969  Gausepohl............................. 94/18

FOREIGN PATENTS OR APPLICATIONS
615,171  2/1961  Canada.................................. 94/18

Primary Examiner—Frank L. Abbott
Assistant Examiner—James L. Ridgill, Jr.
Attorney, Agent, or Firm—Milton J. Wayne

[57] ABSTRACT

The present bracket means are constructed for supporting an elastic sealing body in an expansion gap, for example, in a floor. Angular sections are preferably attached to the walls of gap forming floor members. Sectional members are attached to the angular sections so that channel forming legs thereof point toward the open face of the gap while a lateral extension of each sectional member points towards the center of the gap. The lateral extension provides a gliding bearing for a support member connected to the sealing body.

5 Claims, 1 Drawing Figure

PATENTED MAR 19 1974　　3,797,188
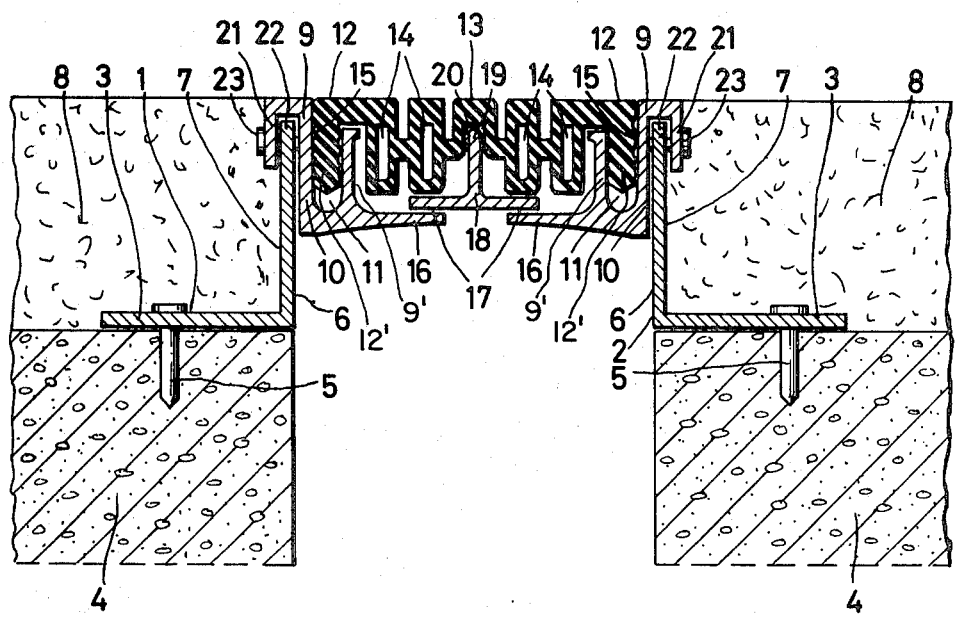

BRACKET STRUCTURE FOR ELASTIC EXPANSION GAP SEALING DEVICES

BACKGROUND OF THE INVENTION

The present invention relates to a bracket structure for elastic expansion gap sealing devices such as are used for covering expansion gaps in the floor of buildings, especially industrial buildings.

Prior art bracket means for the sealing bodies of expansion gap sealing devices comprise two carrier members having an angular cross section. One leg of these angular carrier members is connected to the floor component along a side wall or edge facing the adjacent floor component and thus forming the expansion gap therebetween. The other leg of the angular carrier member which covers the respective gap forming wall comprises one or several grooves for receiving the supporting means for the elastic sealing body.

The bearing strength of the supporting means depends substantially on the rigid seating of the supporting means in said grooves of the leg of the carrier member. Further, these legs of the carrier members have a relatively small sectional width, whereby the depth of said groove or grooves is limited. A small groove depth does not facilitate the above mentioned desired rigid seating. Therefore, the just described prior art supporting structure is not used especially where wide expansion gaps are to be covered in floors which also serve as roadways for vehicular traffic. Even where the expansion gaps are relatively narrow, an insufficient load supporting capability of the supporting means inserted in the expansion gaps influences the smoothness of the vehicular traffic in an undesirable manner, because each wheel of a vehicle follows the yielding of the gap covering means. Thus, depending upon the speed of travel and upon the spacing between adjacent expansion gaps oscillations occur in a vehicle whereby the amplitudes of these oscillations may well add up. Even where the floor is used only for walking, insufficiently supported gap covering means will not withstand the occuring pressure loads whereby the danger for accidents is increased especially where the expansion gaps are relatively wide because a person stepping onto such an expansion gap may trip when the expansion gap covering means yield under the step.

Another disadvantage of insufficient supporting means is seen in that it results in torn out gap coverings due to external pressure loads whereby the seal is destroyed and thereafter moisture and foreign bodies such as dirt or scrap material may enter into the expansion gap.

OBJECTS OF THE INVENTION

In view of the above, it is the aim of the invention to achieve the following objects singly or in combination:

to overcome the drawbacks of the prior art, especially to provide a sealing body supporting structure which will provide an adequate supporting capability for a wide range of pressure loads to which the expansion gap sealing device may be subjected, especially in industrial buildings;

to provide a bracket supporting structure for expansion gap sealing devices which is capable of sustaining high loads while simultaneously avoiding any impeding of the responsive movement of the sealing device either when the expansion gap becomes narrower due to an expansion of the floor forming structural members or when the sealing device follows the widening of a gap due to a contraction of the floor forming members;

to avoid any tearing of the gap sealing body out of its holding means; and to provide a bracket supporting structure which may be adapted to expansion gaps having differing depths.

SUMMARY OF THE INVENTION

According to the invention there is provided a supporting bracket structure for an expansion gap sealing device which preferably comprises two carrier sections having an angular cross section whereby one leg of the angular carrier means is connected to the floor forming member while the other leg of the carrier means forms the wall of the expansion gap proper. Two sectional channel members each including a U-shaped channel which receives a lateral strip of a sealing body, are attached to said carrier means. Each sectional channel member is provided with a lateral extension reaching inwardly toward a center plane of the gap. These lateral extensions point toward each other to provide a slide bearing surface for a support member which rests with each end on the respective extension.

Preferably, said sectional channel members also comprise means for securing these members to the carrier sections, preferably to a marginal portion of the leg forming the gap walls. Such securing means may include a further channel which clamps over the respective leg of the sectional carrier means whereby rivets, screws or the like may be used to reinforce the clamping action.

Such rivet or screw connection assures a substantially more stable and rigid support for the elastic sealing body than the grooves employed heretofore. Moreover, the inwardly reaching, lateral extension of each channel member assures in combination with the support member which is glidingly supported on these extensions, a stable and automatically centered support even for the central region of the elastic sealing body.

BRIEF FIGURE DESCRIPTION

In order that the invention may be clearly understood, it will now be described, by way of example, with reference to the single FIGURE of the accompanying drawing which illustrates a sectional view through a supporting bracket structure according to the invention.

DESCRIPTION OF AN EXAMPLE EMBODIMENT

The present bracket structure comprises substantially two angular sectional carrier members 1 and 2. Each carrier member has one leg extending in parallel to the floor and another leg extending in parallel to a side wall of the floor forming member so that the expansion gap is formed between these side walls or rather between the carrier legs which extend in parallel to these side walls. Thus, a leg 3 of the carrier member 1 is connected to the concrete 4 of the flooring, for example, by bolts 5 forced into said concrete. The other leg 6 covers the side wall 7 of a floor forming member 8. The opposite portion of the gap is formed in the same manner.

Two sectional channel members 10 having the configuration of an F on its back are connected to the carrier legs 6. Each channel member 10 has a flange 9 which forms one leg of a U-shaped groove 11 and which simultaneously rests against the respective leg 6 of each of the angular carrier members 1 and 2. The other wall of the U-shaped groove 11 is formed by a leg 9'. The groove 11 clamps an inwardly extending leg 12' of a lateral or marginal strip 12 of an elastic sealing body 13. The sealing body 13 may, for increasing its elasticity, comprise a plurality of channels 14 arranged so that the sealing body 13 has a labyrinth shaped cross section.

In order to improve the water tight seal of the lateral or marginal strips 12 in the respective groove 11, the lateral strips 12 may be provided with protrusions 15 extending from the sides of the lateral strips 12.

Each sectional channel member 10 comprises a lateral horizontal extension 16 pointing toward a center plane of the gap and toward the extension of the opposite channel member 10. The two extensions of the two channel members 10 provide a glide bearing 17 for a support member 18 which rests with its ends on the respective glide bearing 17 in a sliding manner. The support member 18 is connected to the elastic sealing body 13. The support member 18 is provided for this purpose with a T-shaped cross section including a stem portion 19 which reaches into a groove 20 of the elastic sealing body 13. Preferably, the stem 19 is glued to the groove 20 by an adhesive well known in the art. Due to the connection between the supporting member 18 and the elastic sealing body 13, a relative displacement between the sealing body and the supporting member is prevented during expansion or contraction movements of the sealing device, whereby the latter is maintained in a substantially centered position relative to the gap and whereby the sealing body is also supported along its center portion.

The rigid connection between the U-shaped channel member 10 with the leg 6 of the angular carrier member 1 or 2 is accomplished in that a further extension 21 of the flange 9 forms another U-shaped channel which is inverted relative to the first mentioned channel. The channel extension 21 grips or clamps over an upper edge portion 22 of the leg 6 which covers the gap wall 7. The connection may be reinforced by rivets or screws 23 extending through said lateral channel extension 22. Thus, a double connection between the channel 10 and the leg 6 is provided.

It will be appreciated that the U-shaped sectional channel member 10 may be arranged at any desired position along the depth of the gap whereby the present supporting structure is suitable for use in connection with gaps having different depth and also in connection with sealing devices having a different height.

Another advantage of the invention is seen in that the present supporting structure provides a stable support for the installed elastic sealing body 13 which thus remains absolutely water tight but nevertheless may be easily replaced or repaired at any time. Moreover, the position of the channels 10 may also be selected with due regard to the height of the flooring so as to assure a flush top surface.

The dimensions of the preferably angular supporting or carrier members 1 and 2 may be selected with due regard to the depth of the gap or the width of the flooring. These carrier members 1 and 2 may have any desired suitable cross sectional shape. Thus, the carrier members may be constructed from a plurality of variants since angular sectional steel as well as flat steel may be combined in such a manner that one leg covers the gap wall. The individual carrier elements may be interconnected for giving the carrier member the desired shape, for example, by welding.

Moreover, the arrangement of the T-shaped support member 18 as taught by the invention assures a sufficient spacing of the sealing body 13 from the lateral extensions 16 of the channel members 10 to accommodate the differing shape of the sealing body in response to the width of the gap as the latter varies in response to expansions and contractions of the flooring. As mentioned, the T-shaped member preferably reaches with its stem portion into a groove of the sealing body. This feature centers the sealing body 13 relative to the gap walls and thus avoids uneven displacements in one or the other direction. This feature of the invention has the further advantage that the sealing body will be uniformly supported at its ends as well as at its center whereby it is avoided that the sealing body is insufficiently supported or even not at all on one or the other of its ends.

Although the invention has been described with reference to a specific embodiment, it is to be understood, that it is intended to cover all modifications and equivalents within the scope of the appended claims.

What is claimed is:

1. In a bracket structure for an elastic expansion gap sealing device including a sealing body (13) having a longitudinal, lateral strip (12) along each of its sides for sealing an expansion gap formed by opposite walls of structural members (4, 8), the improvement comprising first and second sectional support members (10), each of said sectional support members (10) having a first vertical leg (9), a second vertical leg (9') and a third substantially horizontal leg (16) which legs together form substantially the configuration of an F on its back, said first and second vertical legs (9, 9') forming an outwardly open U-channel, each of said lateral strips (12) of the sealing body (13) having an inwardly extending leg (12'), said inwardly extending legs (12') being rigidly clamped in said outwardly open U-channel (11), means (23) connecting each first vertical leg (9) of the sectional support members (10) to a respective one of said opposite walls of the gap, each of said substantially horizontal legs (16) of said sectional support members (10) forming an extension (16) pointing toward each other and forming a supporting glide surface (17), and a third support member (18) for said sealing body (13), said third support member (18) having a horizontal bar of sufficient length so that it rests with its ends in a gliding manner on said supporting glide surface (17), and a vertical bar (19) connecting said third support member (18) to said sealing body (13), whereby said lateral strips are tightly held in a sealing position against the respective gap edge in any condition of the gap.

2. The bracket structure according to claim 1, wherein the horizontal and vertical bars of the third support member form a T-section, said sealing body comprising a groove for receiving said vertical bar of the T-section.

3. The bracket structure according to claim 1, further comprising angular section members each having a first leg connected to the respective one of said structural members and a second leg forming one of said opposite gap walls, said first vertical legs of said first and second sectional support members being connected to the respective second leg of the adjacent angular section member.

4. The bracket structure according to claim 3, wherein said second leg of the angular section members has an outer edge pointing upwardly relative to the gap, said connecting means comprising an inverted U-shaped groove forming an extension of each of said first vertical legs which groove clamps over said outer edge of the second leg of the respective angular section member.

5. The bracket structure according to claim 4, wherein said connecting means further comprise screws or rivets extending through said inverted U-shaped groove and through said outer edge.

* * * * *